United States Patent [19]

Anderson

[11] 3,901,871

[45] Aug. 26, 1975

[54] PROCESS OF PREPARING α-L-ASPARTYL-L-PHENYLALANINE METHYL ESTER

[75] Inventor: George Washington Anderson, Upper Saddle River, N.J.

[73] Assignee: American Cyanamid Company, Stamford, Conn.

[22] Filed: Sept. 21, 1973

[21] Appl. No.: 399,650

[52] U.S. Cl. ............................ 260/112.5; 426/217
[51] Int. Cl.² ................... C07C 103/52; A23L 1/22
[58] Field of Search ............................... 260/112.5

[56] References Cited
UNITED STATES PATENTS

| | | | |
|---|---|---|---|
| 3,769,333 | 10/1973 | Lapidus et al. | 260/112.5 |
| 3,786,039 | 1/1974 | Ariyoshi et al. | 260/112.5 |
| 3,798,204 | 3/1974 | Nakajima et al. | 260/112.5 |
| 3,798,206 | 3/1974 | Uchiyama et al. | 260/112.5 |
| 3,799,918 | 3/1974 | Mazur | 260/112.5 |
| 3,801,563 | 4/1974 | Nakajima et al. | 260/112.5 |
| 3,808,190 | 4/1974 | Dahlmans et al. | 260/112.5 |
| 3,814,747 | 6/1974 | Lapidus et al. | 260/112.5 |
| 3,819,607 | 6/1974 | Heuser et al. | 260/112.5 |

FOREIGN PATENTS OR APPLICATIONS

| | | |
|---|---|---|
| 2,040,473 | 1/1971 | France |
| 2,107,411 | 8/1971 | Germany |

*Primary Examiner*—Elbert L. Roberts
*Assistant Examiner*—Reginald J. Suyat
*Attorney, Agent, or Firm*—Ernest Y. Miller

[57] ABSTRACT

An improved process for the preparation of α-L-aspartyl-L-phenylalanine methyl ester, is described. This compound is useful as a sweetening agent.

2 Claims, No Drawings

PROCESS OF PREPARING α-L-ASPARTYL-L-PHENYLALANINE METHYL ESTER

DESCRIPTION OF THE PRIOR ART

It is well known that cyclamates, which enjoyed a large portion of the market for artificial sweeteners, were recently banned from manufacture and sale by the Federal Government because of so called undesirable side effects. A similar fate has been predicated recently for saccharin although this has not yet taken place. A considerable market therefore exists for a substantially non-toxic, low side effects artificial sweetener. Esters of the type α-L-aspartyl-L-phenylalanine methyl ester have been described as sweetening agents (Ajinomoto, German Pat. No. 2,104,620; French Pat. No. 2,040,473; German Pat. Nos. 2,064,482 and 2,233,535). The above compound has been described as having been prepared by the reaction of aspartic anhydride hydrochloride with methyl-L-phenylalaninate in the presence of ethylene dichloride and carbon dioxide and recovering the product.

DESCRIPTION OF THE INVENTION

It has now been found that when the filter cake from the above reaction is slurried with isopropanol, the product recovered and recrystallized from about equal portions of isopropanol and water, a pure product in high yields is obtained. The product is obtained in yields of at least 5% greater than prior art methods [Bulletin of the Chemical Society of Japan, Vol. 46, 1893–1895 (1973)], and involve less procedural steps in obtaining substantially pure product. For instance, the latter reference describes the reaction of L-aspartic anhydride hydrochloride with methyl L-phenylalaninate in acetic acid and ethylene dichloride to give an α, β mixture which is separated through the hydrochloride salt which is then neutralized with sodium carbonate and recovered by subsequent column chromatography. This process involves many steps, a number of which are eliminated in the present process.

The reaction which takes place in the present process can be illustrated as follows:

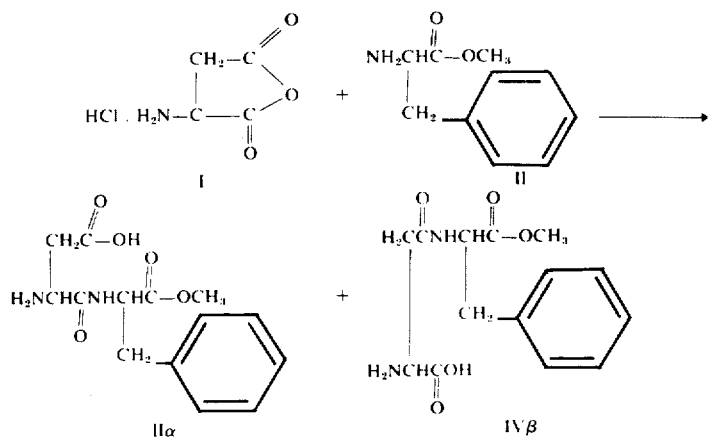

In carrying out the above process, it is preferable that methyl-L phenylalaninate be present in quantities at least four times that of aspartic anhydride hydrochloride. This is desirable in order to neutralize the hydrochloride salt and to obtain a greater quantity of the Alpha-compound over the Beta-compound. The Alpha-compound is the desired product and is usually obtained in quantities of about five times that of the Beta-compound.

In carrying out the process of reacting methyl-L-phenylalaninate with aspartic anhydride hydrochloride a by-product consisting essentially of methyl-L-phenylalaninate hydrochloride is obtained. Since the latter compound is the more expensive component of the reaction, it can be recycled to produce a further quantity of the desired end product.

When the reaction product of methyl-L-phenylalaninate and aspartic anhydride hydrochloride is diluted with a small amount of water, the product precipitates. On slurrying with isopropanol, the isopropanol removes undesirable by-products including starting materials. When the product is crystallized from isopropanol-water, substantially pure product is obtained. The present process eliminates the necessity of converting the impure product to a salt, crystallization of the salt, neutralization, de-salting and further crystallization as described in the prior art.

SPECIFIC DISCLOSURE

The following example describes in detail the process of the present invention.

EXAMPLE

Preparation of α-L-aspartyl-L-phenylalanine methyl ester

A mixture of 9.22 g. aspartic acid, 7.88 g. of phosphorus trichloride and 32.8 g. of glacial acetic acid is mechanically stirred at room temperature overnight. The mixture is protected from moisture during the operation. The mixture is filtered under nitrogen and the residue washed with 16 ml. of acetic acid and then with 38 ml. of ethylene dichloride. The residue is either suspended in 100 ml. of ethylene dichloride to be added subsequently to methyl phenylalanine or stored in the dry state in a vacuum desiccator. The aspartic anhydride hydrochloride can be added in the dry state. Either mode of addition is satisfactory.

A portion of 54.2 g. of methyl phenylalaninate hydrochloride, (55 gm./150 ml. water) of sodium carbonate and 500 ml. of ethylene dichloride are shaken together. The water layer is withdrawn and the ethylene dichloride layer mixed with 100 g. of sodium sulfate. A second extraction of the aqueous layer is made with 100 ml. of ethylene dichloride. The two ethylene dichloride solutions are combined. The sodium sulfate is removed by filtration and the residue washed with 100 ml. of ethylene dichloride. The washings and filtrate are combined (total volume 700 ml.).

The solution containing methyl L-phenylalaninate (prepared above) is cooled to −10°C., carbon dioxide supplied from solid carbon dioxide is passed into the stirred solution, and the aspartic anhydride hydrochloride (prepared above) added in one portion. The mixture becomes clear, then after about 15 minutes becomes opaque and increasingly viscous. Two hours after the addition of the anhydride, the cooling bath is removed, 6.0 ml. of water added and the mixture stirred for an additional 15 minute period. The gelatinous solid is then isolated by filtration. The wet cake is slurried with 100 ml. of isopropanol, filtered and washed with 50 ml. of isopropanol (residue A).

The ethylene dichloride filtrates are shown to have H. Phe. OMe and moderate amounts of α and β aspartylphenylalanine methyl esters by thin layer chromatography (CMW system chloroform 40, methanol 20 and water 4). A small amount of precipitate is obtained by the addition of 2 ml. of water and refrigeration. This is combined with the precipitate formed in the isopropanol washes (overnight at room temperature), washed with several small portions of isopropanol and dried in a steam oven (residue B) wt. 3.21 g.

Residue A is stirred vigorously in a beaker with 250 ml. isopropanol, collected, washed with 50 ml. isopropanol and dried, wt. 12.0 g. Thin layer chromatography shows both A and B to be principally the desired α dipeptide with possibly a small amount of β, and small amounts of H.Phe.OMe, H.Asp.OH, and an unidentified material ($R_f$ 0.1). The second isopropanol filtrate (250 + 50 ml.) has a strong H.Phe.OMe spot at $R_f$ 0.98 on TLC, with a lesser α dipeptide (about 0.6).

A and B are combined and recrystallized from 250 ml. of 50—50 isopropanol-water, including wash, to give 8.36 g. (oven dried) of product, melting point 248°–253° (brown), softens about 190°C. An authentic sample has the same melting point but with less softening at 190°C. Thin layer chromatography in (CMW) showed only very faint H.Phe.OMe and $R_f$ 0.1 impurities when very heavily spotted. In the (BAW system (40 n-butanol-4 HOAc-12 $H_2O$)) a strong α dipeptide spot at $R_f$ 0.39 with a trace impurity at 0.25 (corresponding to the 0.1 in CMW) were obtained. The addition of 100 ml. isopropanol to the recrystallization filtrate gives 0.44 g. of crystalline β isomer on refrigeration for a week. Concentration of the filtrates to 50 ml. and refrigerating yielded 1.80 g. of a mixture of α and β.

I claim:

1. In a method of preparing α-L-aspartyl-L-phenylalanine methyl ester by contacting methyl-L-phenylalaninate and aspartic anhydride hydrochloride in the presence of carbon dioxide and ethylene dichloride at a temperature below 0°C. the steps which comprise adding a small amount of water, separating the product as a precipitate, slurrying the precipitate with isopropanol, removing the product from the slurry and crystallizing the said product from a mixture of isopropanol and water.

2. A method in accordance with claim 1, wherein the product is crystallized from a mixture of about equal parts of isopropanol and water.

* * * * *